United States Patent [19]

Solbes

[11] 4,375,293
[45] Mar. 1, 1983

[54] FRONT SUSPENSION AND STEERING SYSTEM FOR CYCLES AND MOTORCYCLES HAVING TWO INTERDEPENDENT POINTS OF SUPPORT ON THE GROUND

[76] Inventor: Francisco Solbes, 3, rue Lavoisier. Lambres, Douai, France, 59500

[21] Appl. No.: 203,957

[22] Filed: Nov. 4, 1980

[30] Foreign Application Priority Data

Nov. 7, 1979 [FR] France ................................ 79 27419

[51] Int. Cl.³ .............................................. B60G 7/00
[52] U.S. Cl. .............................. 280/21 A; 280/112 A; 280/691
[58] Field of Search .................... 280/21 R, 21 A, 209, 280/267, 268, 6.11, 682, 111, 690, 696, 670, 672, 112 A, 691

[56] References Cited

U.S. PATENT DOCUMENTS

| | | | |
|---|---|---|---|
| 1,993,458 | 3/1935 | Sintz | 280/6.11 X |
| 2,217,818 | 10/1940 | Ronning | 280/690 X |
| 2,299,241 | 10/1942 | Kumm | 280/670 |
| 2,563,370 | 8/1951 | Reese | 280/670 X |
| 3,309,097 | 3/1967 | Seeber | 280/6.11 |
| 3,893,533 | 7/1975 | Tidwell | 180/31 |
| 4,003,443 | 1/1977 | Boughers | 180/27 |

FOREIGN PATENT DOCUMENTS 2153746  5/1973  France .
2051703  1/1981  United Kingdom ............... 280/6.11

*Primary Examiner*—Joseph F. Peters, Jr.
*Assistant Examiner*—Michael Mar
*Attorney, Agent, or Firm*—Brooks, Haidt, Haffner & Delahunty

[57] ABSTRACT

The present invention relates to a suspension and steering system enabling the road holding, braking efficiency and safety of presently known cycles and motorcycles of all types, on wheels or on skis, to be increased, while maintaining their capacity to bank when cornering, their handling ability and small dimensions. This system is composed of the combination of two sub-systems-:—the suspension sub-system intended to carry two wheels or two skis, comprises: (a) a mechanism composed of two forks, two pairs of guide shafts, and two supports. The forks move over the guide shafts which are fixed to the supports; (b) a mechanism composed of a support, a rocking arm and a handle bar. This arm rocks on the axis of the support and allows the interdependent displacements of the forks;—the steering sub-system is intended on the one hand to carry the above mentioned mechanisms of the suspension sub-system and on the other hand to be articulated on the frame at the steering column and the reinforcing arm. It is composed of the devices which form the central shaft.

15 Claims, 23 Drawing Figures

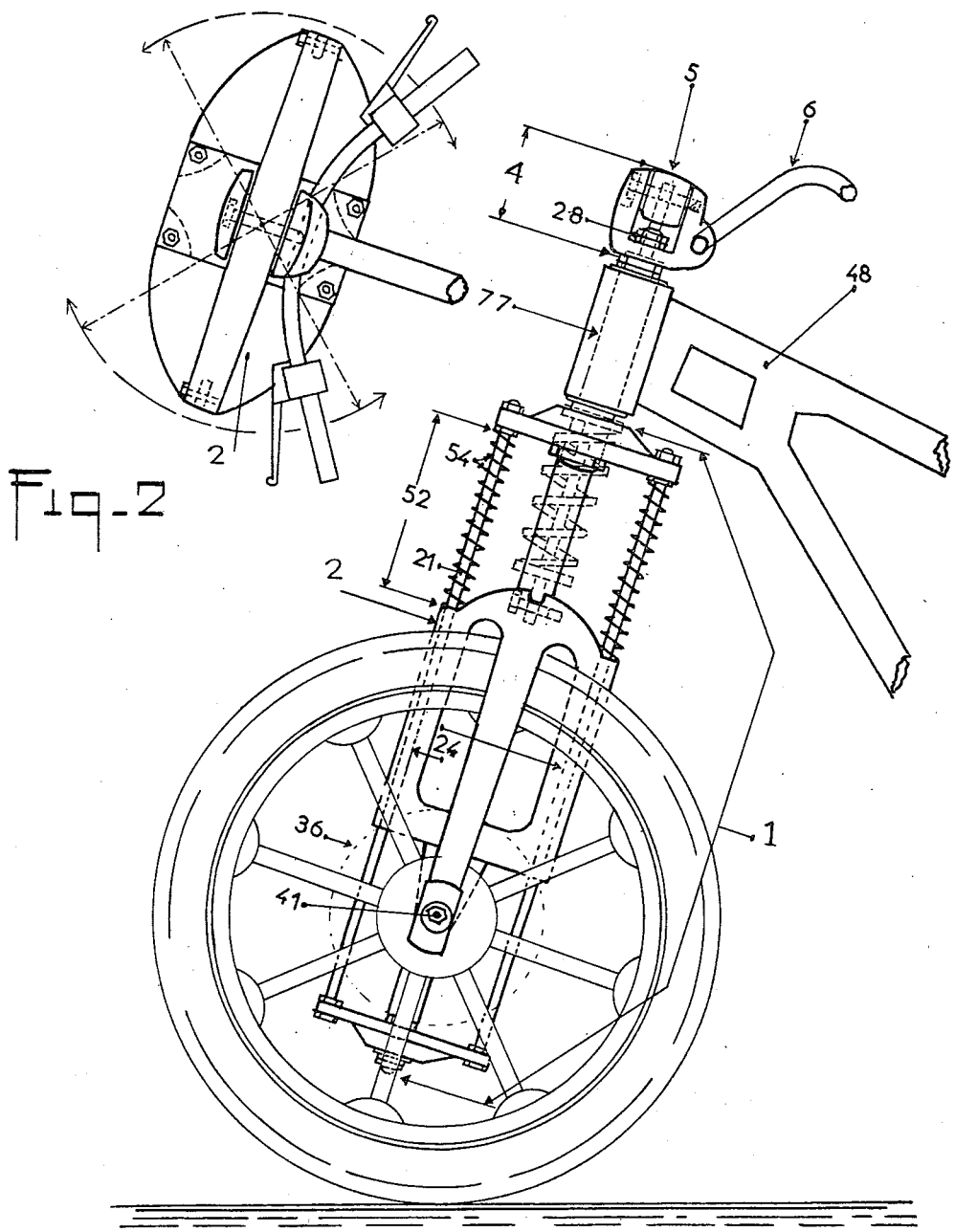

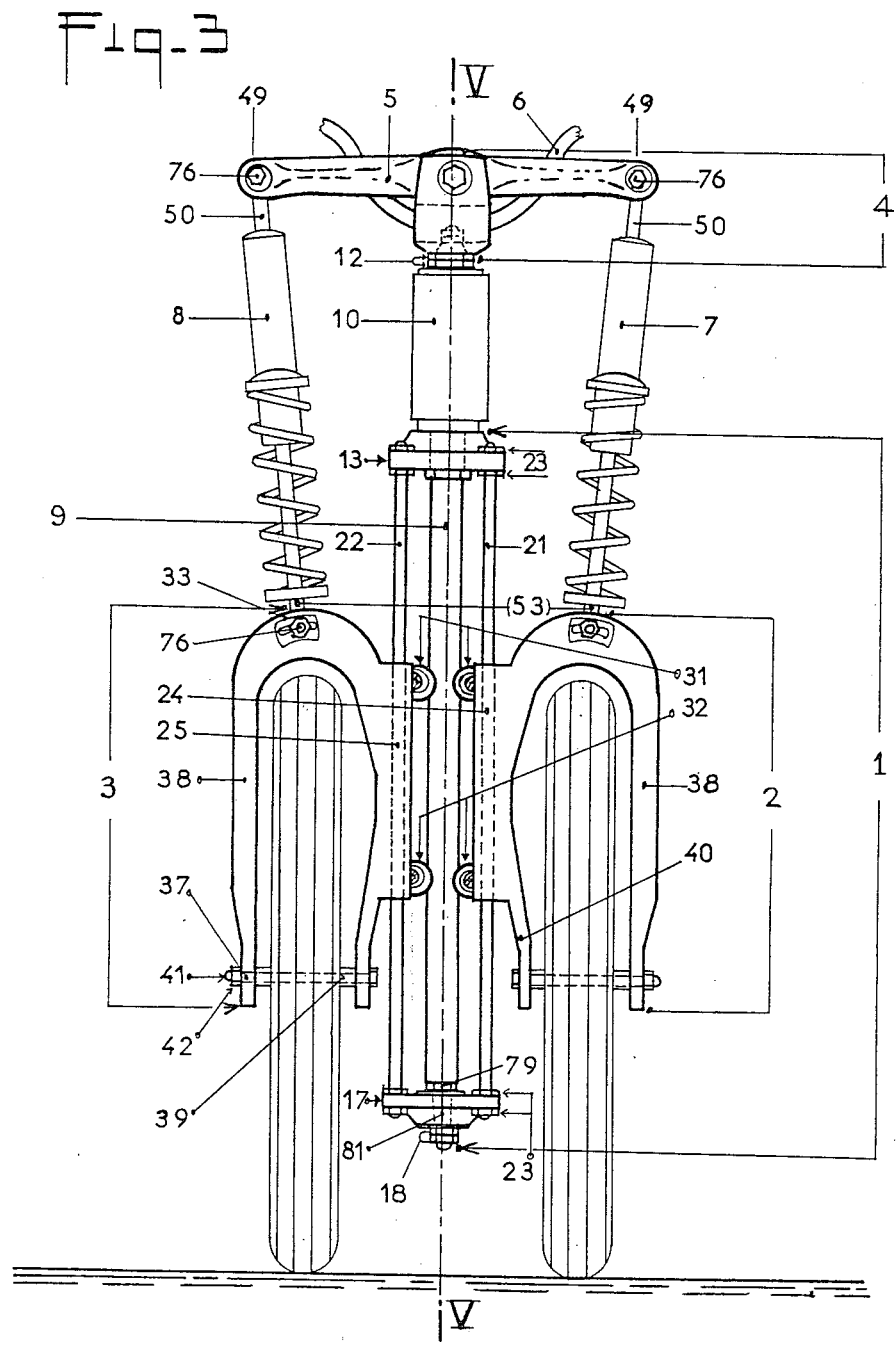

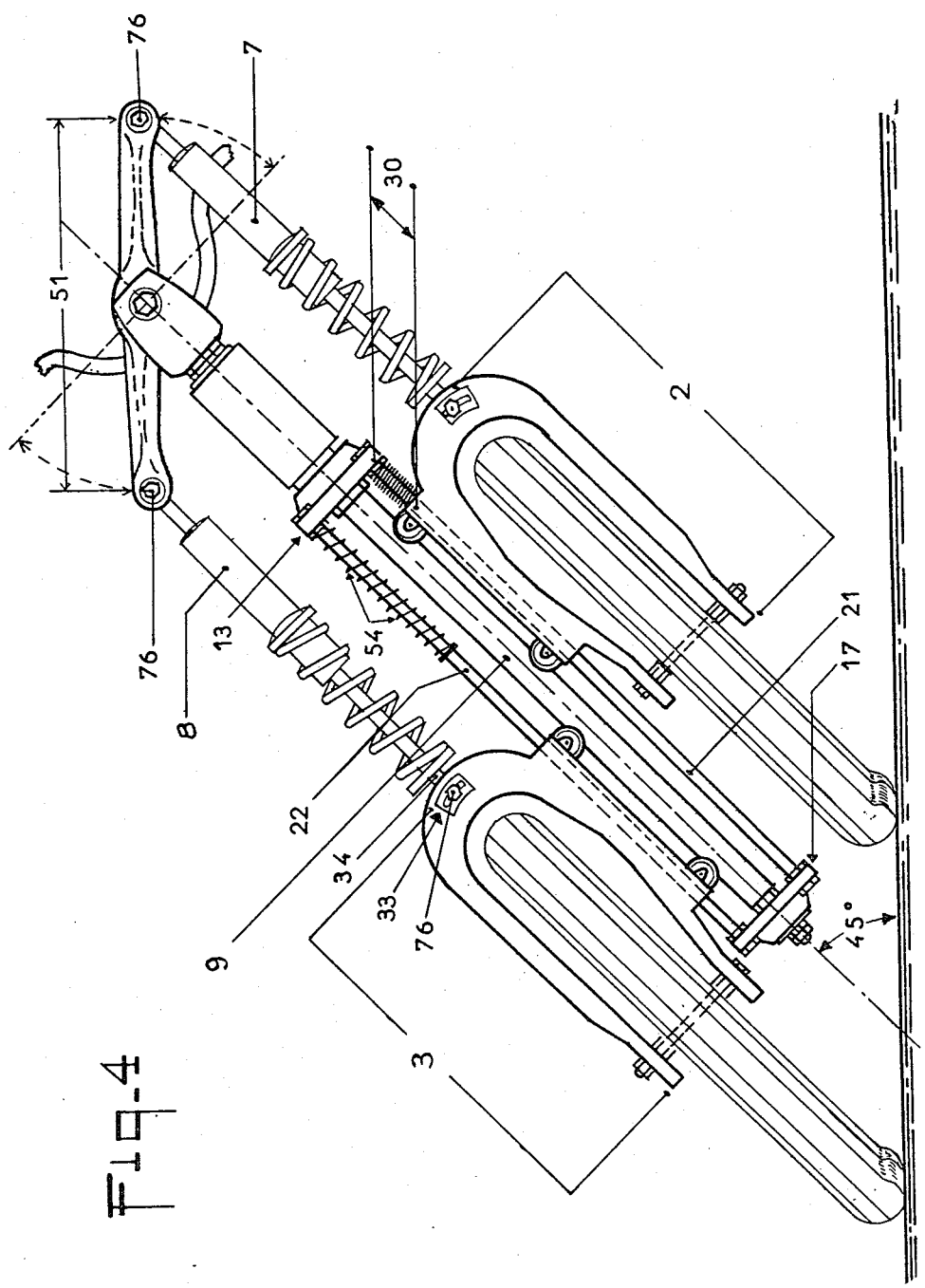

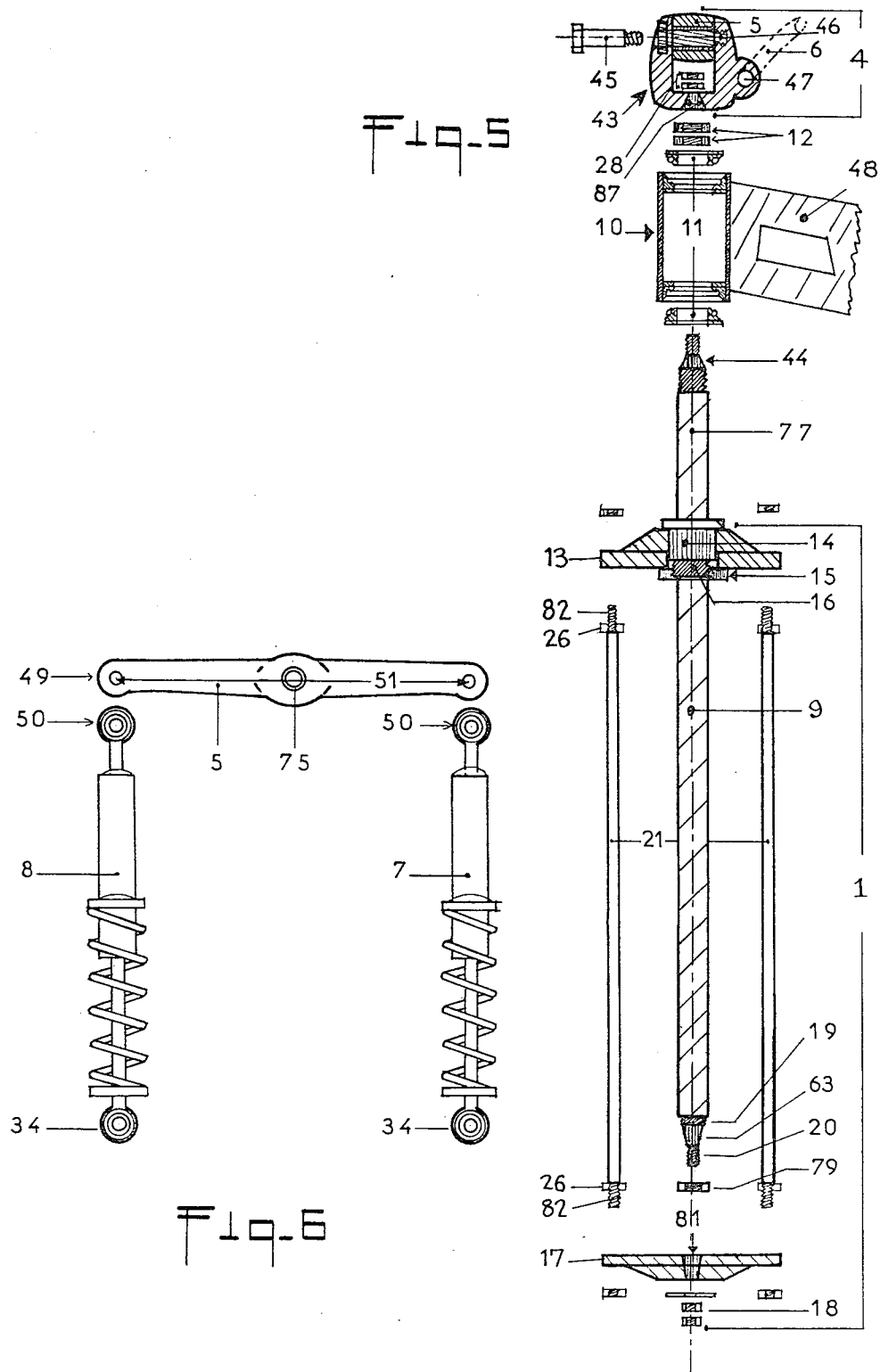

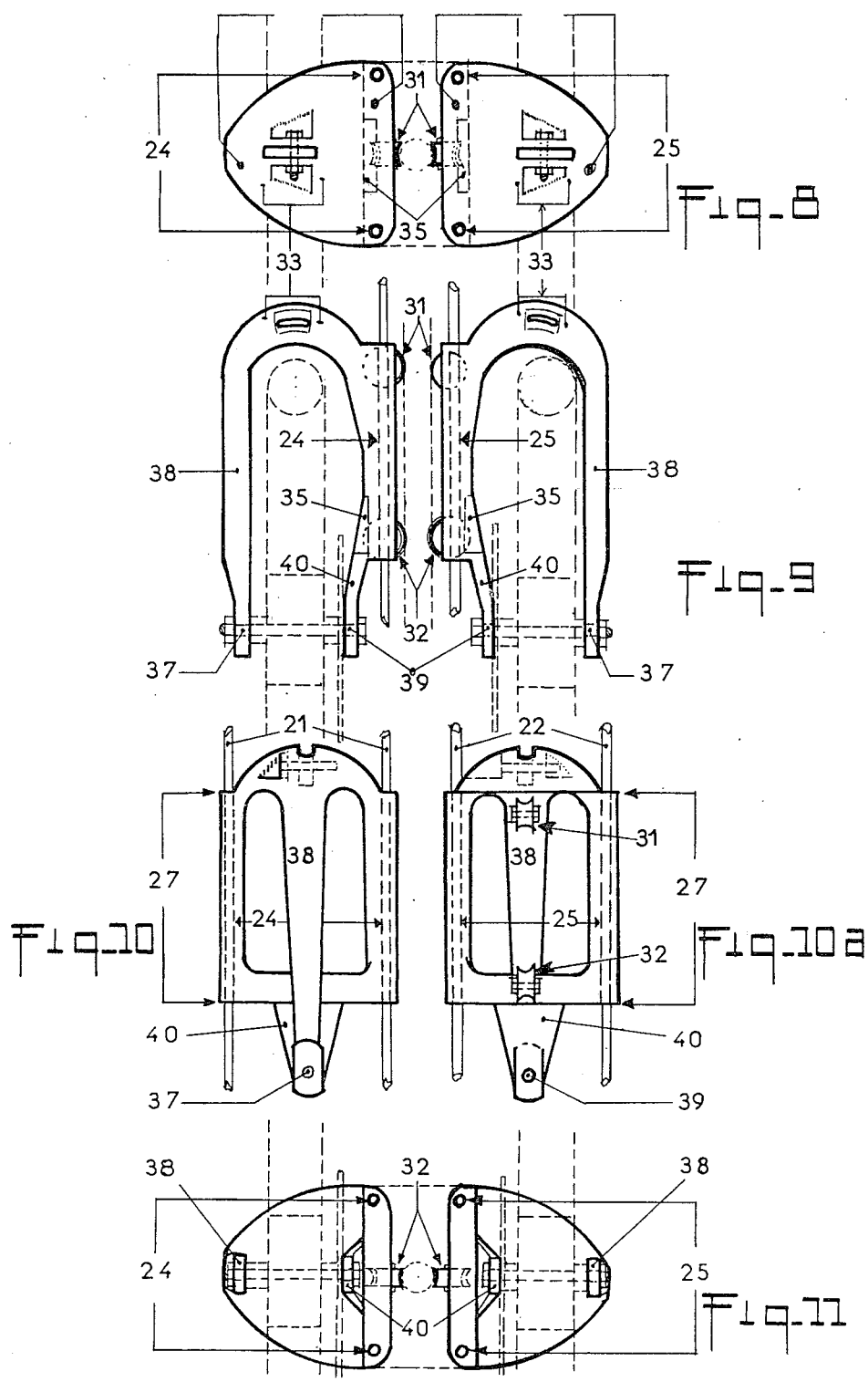

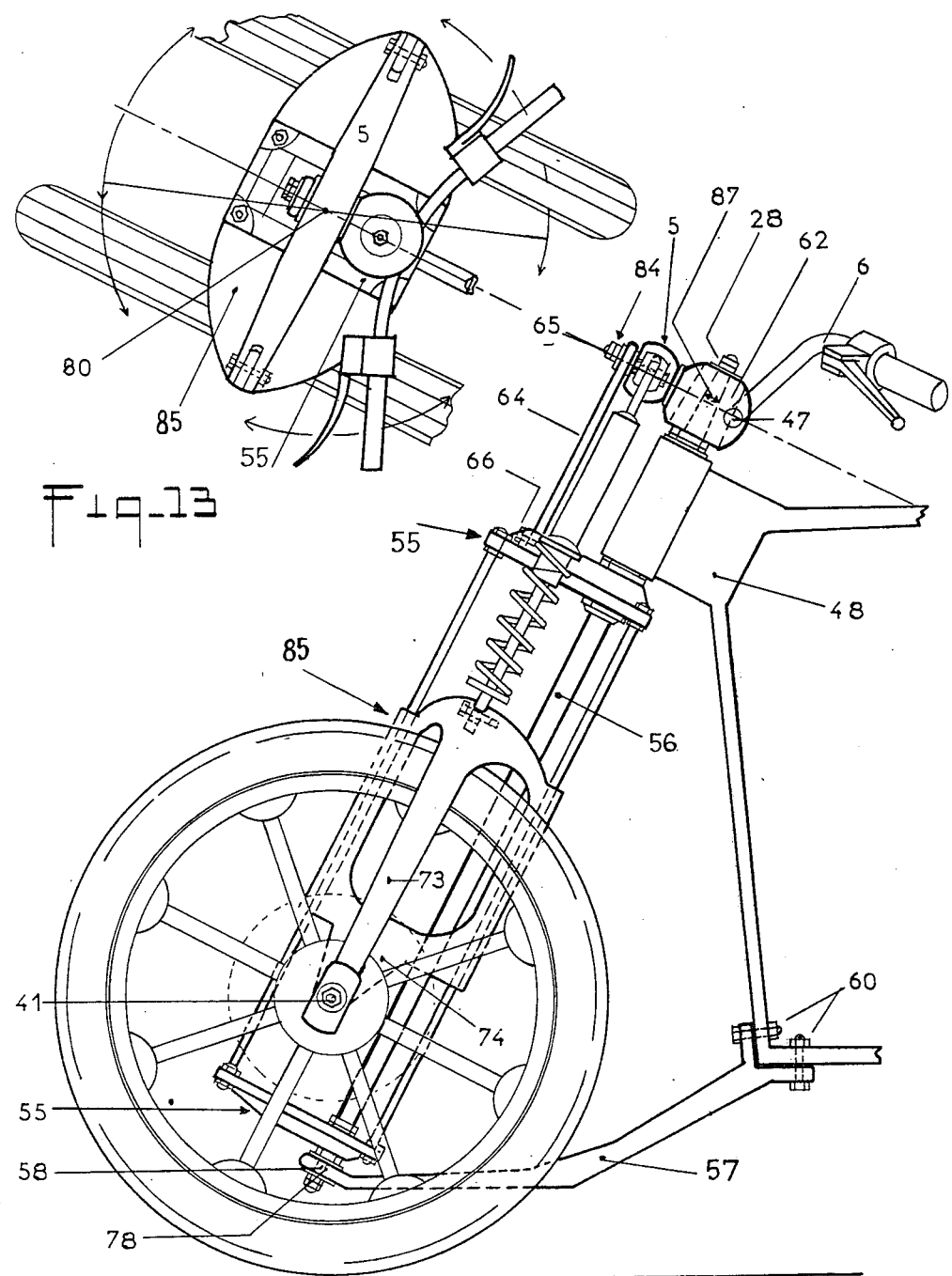

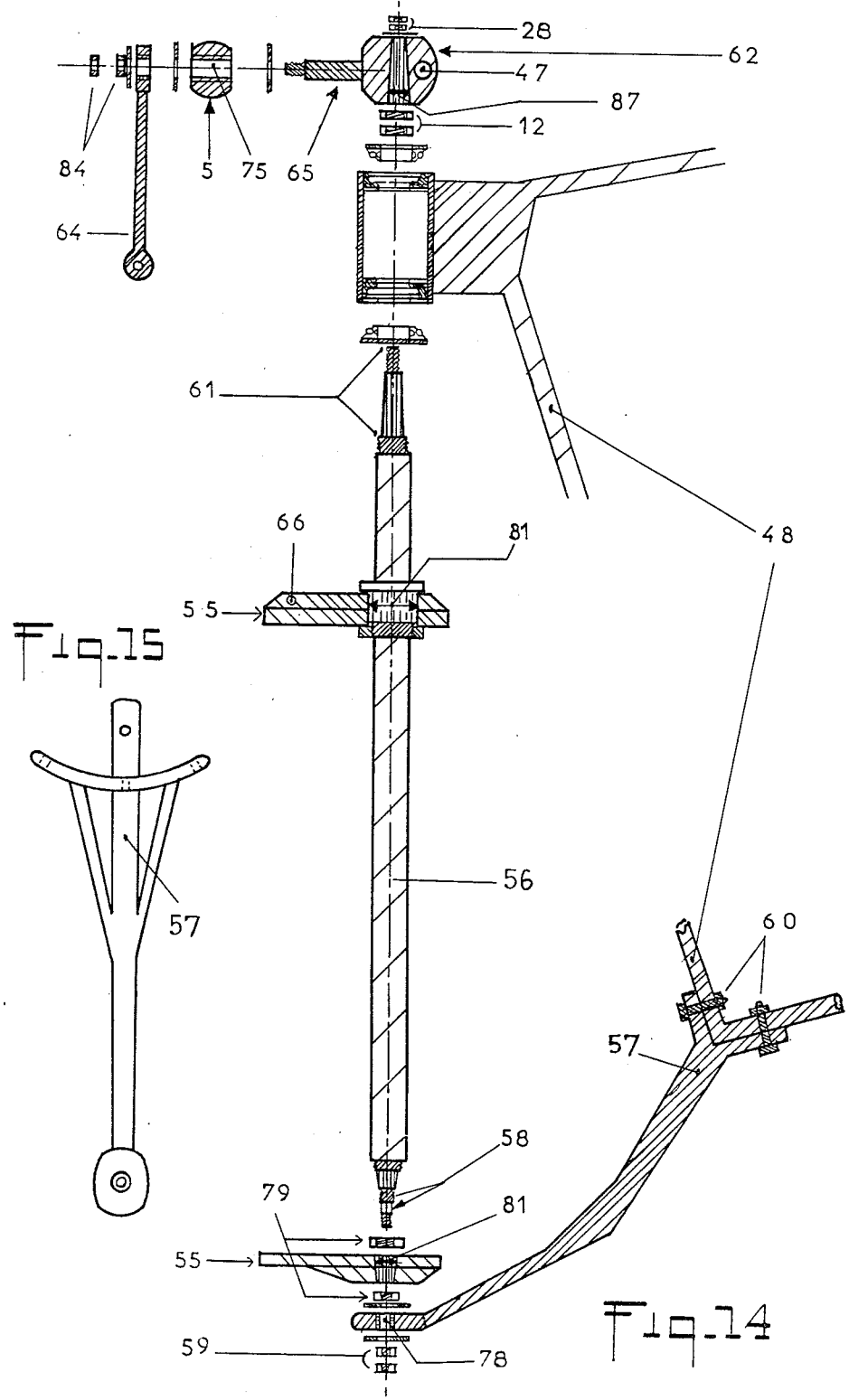

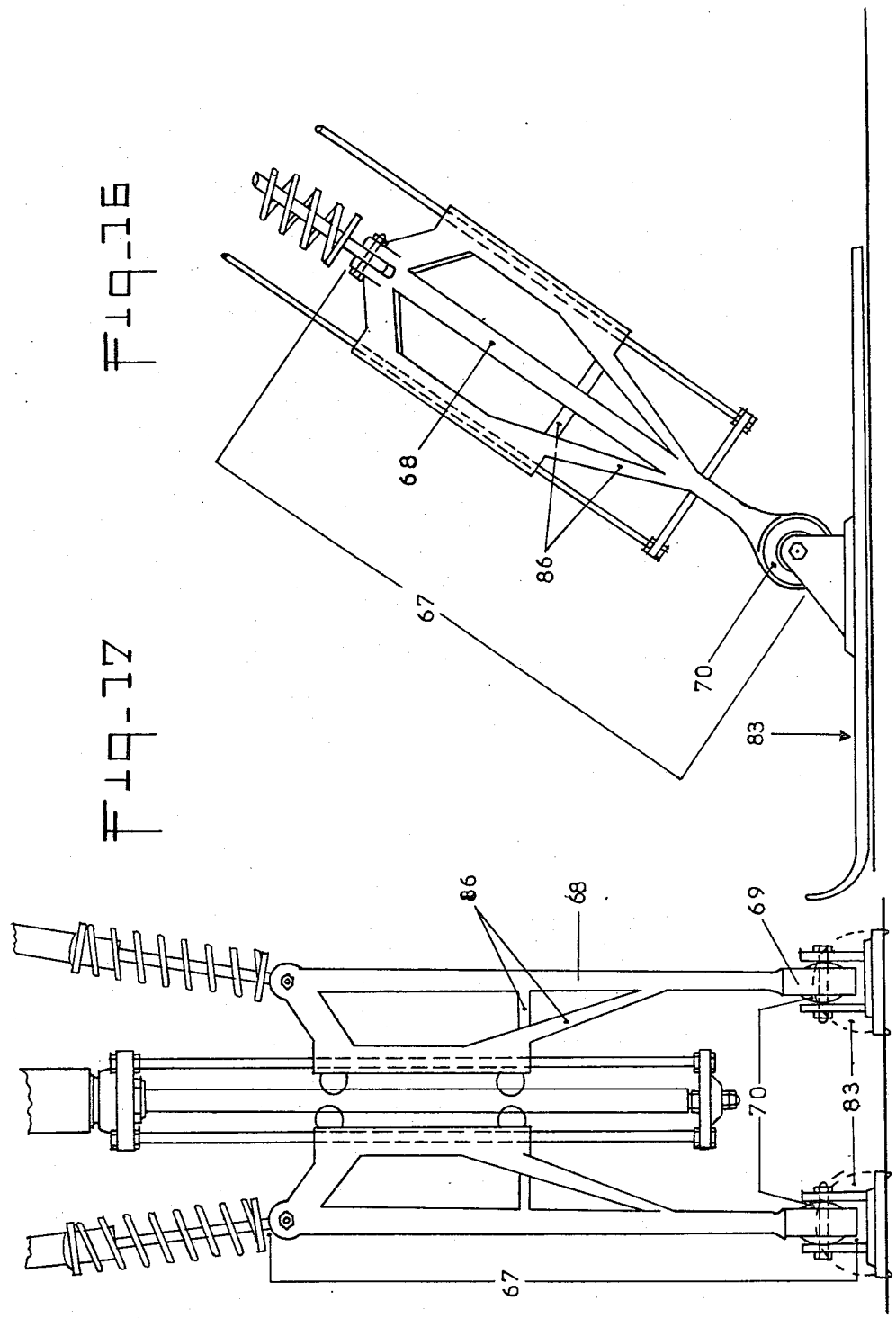

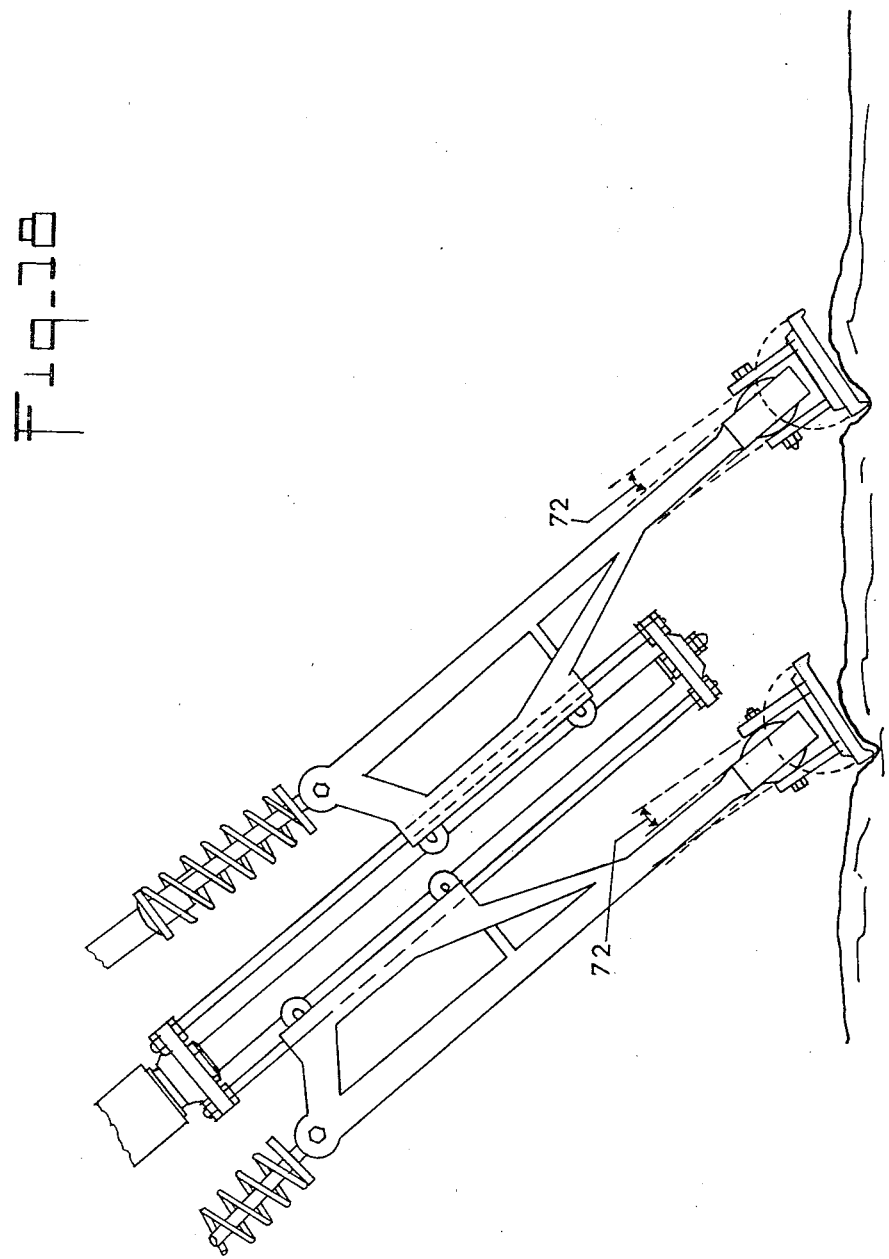

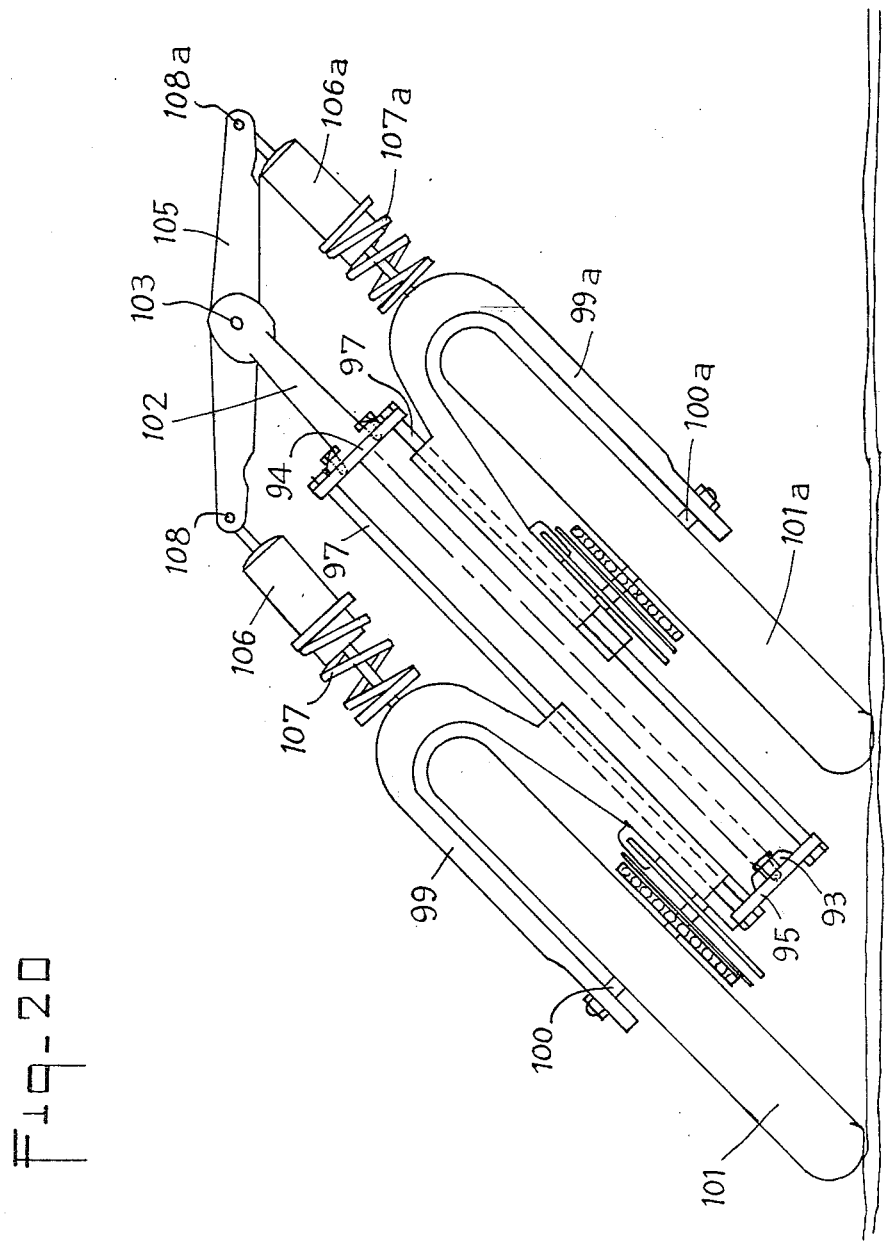

FRONT SUSPENSION AND STEERING SYSTEM FOR CYCLES AND MOTORCYCLES HAVING TWO INTERDEPENDENT POINTS OF SUPPORT ON THE GROUND

The present invention relates to the suspension and steering of cycles and motorcycles on wheels or on skis.

In the present state of the art in motorcycles, it is found, in the front suspension and steering system and in the back suspension and drive system, that they are designed so that each comprises only one wheel or point of support. Thus, the motorcycle abuts on the ground on two points independent of each other: the front wheel and the back driving wheel. This number of wheels, the arrangement thereof and the suspension, steering and drive mechanisms associated therewith form the suspension systems of the motorcycles.

The road holding, braking efficiency and safety offered thereby are generally inferior to the road holding, braking efficiency and safety of automobile vehicles.

In fact, if, for any reason, one of the two wheels of a presently known motorcycle loses adherence, the cycle loses balance and there will probably be an accident. This is the case for example when one of the two wheels or both wheels at the same time hit a stone, skid on an oil patch, etc. This happens both when traveling in a straight line and when cornering. Braking also suffers from this two-wheel system.

These technically inferior properties of presently known motorcycles are to some extent compensated by their main features, namely: possibilities of banking when cornering, small dimensions and good handling ability.

The front suspension and steering system with two wheels, or two interdependent points of support, enables these drawbacks to be reduced to a maximum whilst maintaining the essential features of the presently known motorcycles.

According to the invention, it comprises two members for supporting the wheels or the skis which are mounted to slide in parallel on a guide means fast with a steering assembly mounted to pivot on the frame of the cycle, said steering assembly comprising, in its upper part, a steering member and an arm rocking in its median part respectively connected at its two ends by two suspension members to the two members for supporting the wheels or the skis.

In fact, a presently known motorcycle on which the suspension and steering system according to the invention is mounted at the front, whilst maintaining the present system of back suspension and drive comprising one wheel, is a motorcycle which is supported on the ground on two interdependent steering wheels at the front and on one drive wheel at the back. These two interdependent steering wheels according to the invention render the motorcycle safer and more efficient from two standpoints: stability, road holding and braking, on the highway, and especially when cornering, but also in cross country racing, or on any other ground, whilst the possibility of banking, the small dimensions and handling ability are maintained. The same applies to motorcycles on water, snow or ice skis, as it would suffice to mount on the system of the invention two forks carrying skis instead of the two forks carrying wheels.

The invention will be more readily understood on reading the following description with reference to the accompanying drawings, in which:

FIG. 1 is a view in side elevation of an embodiment of the suspension and steering device of cycles or motorcycles according to the invention;

FIG. 2 is a plan view of the suspension and steering device according to the invention;

FIG. 3 is a front elevation view of the suspension and steering device shown in FIG. 1;

FIG. 4 is a front elevation view of the device in inclined position with respect to the ground;

FIG. 5 is an exploded sectional view along line V—V of FIG. 3;

FIGS. 6 and 6a are exploded views in front elevation of of the suspension and steering device;

FIG. 8 is a detailed plan view, from above, of the forks carrying the wheels;

FIG. 9 is a detailed front view of the forks carrying the wheels;

FIGS. 10, 10a are side views showing the outside and inside of the forks carrying the wheels;

FIG. 11 is a detailed plan view, from underneath, of the forks carrying the wheels;

FIG. 12 is a side elevation view of another embodiment of the suspension and steering device according to the invention;

FIG. 13 is a plan view of the device shown in FIG. 12;

FIG. 14 is an exploded view in side elevation of the device shown in FIG. 12;

FIG. 15 is a plan view of the reinforcing arm shown in FIG. 12;

FIG. 16 is a view in side elevation of another embodiment of the device provided with skis;

FIG. 17 is a view in front elevation of the device provided with skis;

FIG. 18 is a view in front elevation of the device provided with skis, in inclined position;

FIG. 20 is a view in front elevation of the suspension device shown in FIG. 19.

Figure 7:
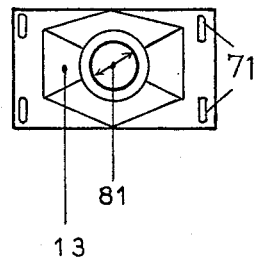
FIGS. 7 and 7a are plan views of the plates for supporting the guide rods of the forks.
Figure 7A:
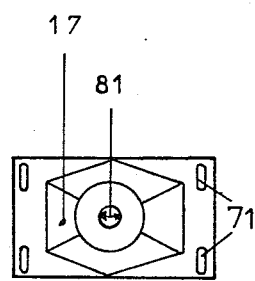

Referring now to the drawings, the suspension and steering device forming the subject matter of the invention is, viewed as a whole, composed of a suspension sub-assembly and of a steering sub-assembly, as shown in FIGS. 1, 2, 3 and 4.

The suspension sub-assembly comprises a mechanism 1 (FIG. 3) carrying the two suspension forks 2 and 3 and a mechanism 4 carrying the rocking arm 5 and the handle bar 6; the two suspension dampers 7 and 8 connect the suspension forks to the rocking arm 5 held by the mechanism 4 which carries it.

The steering sub-assembly (FIG. 3) comprises the main central shaft 9 which is connected to the frame at its steering column 10, due to a steering mechanism. This central shaft supports the mechanism 1 carrying the forks in its median and lower parts and, in its top end part, the mechanism 4 carrying the rocking arm and the handle bar.

The above-mentioned mechanisms are shown in detail in FIGS. 5, 6, 7, 8, 9, 10, 10a, 11.

The mechanism 1 carrying the suspension forks is composed of two supports, four fork guide shafts and two forks.

The upper support 13 is fixed at 14 to the central shaft 9 and it is blocked by the nut 15 which is screwed at 16 on the central shaft 9. The lower support 17 is blocked at 63 at the lower end of the central shaft 9 by nuts 18 and 79 which are screwed at 19 and at 20 on this central shaft 9.

Figure 6A:
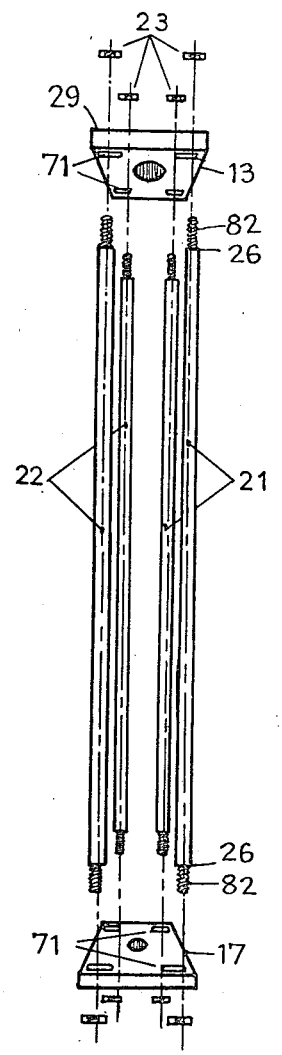

The four guide shafts of the forks are fixed to the four orifices 71 in the upper support 13 and to the four orifices 71 in the lower support 17. These four guide shafts are disposed in parallel pairs 21 and 22 and are maintained rigid and strained due to their fixations to the two supports by means of their respective nuts 23 screwed at their threaded ends 82. The pair of guide shafts 21 (FIG. 1) passes through the suspension fork 2 in its bores 24 and the pair 22 passes through the fork 3 in the bores 25 (FIGS. 6 and 9). Each pair of guide shafts therefore maintains a suspension fork which it guides, in position on its axes. The slide of the bores of the forks on these guide shafts enables the forks to move upwards and downwards within the limits of the length of the cylindrical part of the guide shafts, itself limited by the supports which maintain these same shafts. This length of the guide shafts is proportional to the length of the bores of the forks and to the width of the supports. In FIGS. 4, 5, 6, 8, 9, 10, 11 and by way of example of the proportions to be respected, the length 26 of the guide shafts is 2.6 times greater than the length 27 of the bores 24 or 25 (FIG. 9) of the forks, and 5.2 times greater than the front width 29 of the supports.

These proportions enable the motorcycle, on which the device according to the invention is mounted, to take corners at an angle of inclination of 45°, as may be seen in FIG. 4, whilst keeping a reserve movement 30 which makes it possible to face excessive inclination or displacement of the forks provoked, for example, by one of the wheels striking a stone when cornering. This excess displacement of the forks may be made without their striking the supports 13 and 17 which limit their movements.

In order to lighten the forces and pressures that the forks may exert on their guide shafts which maintain them, each suspension fork is provided with two small wheels 31 and 32 (FIGS. 8, 9, 10), one of which is located at the centre of the inner part of the head of the forks and the other is located at the inner part of the lower base of the bores. The contact surface of these wheels is concave and they have grooves which abut on the part of the central shaft 9 included between the two supports 13 and 17 carrying the guide shafts, which is cylindrical in this part.

Each suspension fork has a device 33 for fixing the feet 34 of the suspension dampers 7 and 8 (FIG. 6), as well as a device 35 enabling it to house and fix a brake mechanism of the brake disc 36 (FIG. 1). The orifice 37 in the foot of the outer arm 38 of the forks is located opposite and symmetrically with respect to the orifice 39 of the inner arm 40 which leaves from each side of the base of the two fork bores 24. The pivot pin 41 for the wheels is fixed on these two orifices and is maintained locked by the nut 42. The mechanism 4 carrying the rocking arm 5 and the handle bar 6 is composed: (a) of a support 43 which is fixed at 44 to the central shaft 9, (b) of a rocker arm 5 and (c) of a handle bar 6.

The rocker arm is connected to the support 43 due to the pivot pin 45. This pin passes through the front part of the support and the central bore 75 of the elastic sleeve which maintains it blocked and is screwed in the rear part of the support at 46.

The steering handle bar is fixed in the orifice 47 in the support 43 which carries it.

The rocker arm is provided at each of its ends with a device 49 which allows the heads 50 of the suspension dampers 7 and 8 to be fixed. The length 51 of this rocker arm 5 is proportional to the length of displacement of the suspension forks, and also to the length of the distance which separates the feet of the suspension dampers.

FIGS. 1, 2, 3, 4, 5, 6 show the proportions to be respected: the length 51 of the rocker arm 5 is twice the length 52 of displacement of the forks and 1.4 times greater the distance 53 which separates the feet of the dampers 7 and 8, of which the feet are fixed to the forks 2 and 3 at 33. This proportionality is necessary for a motorcycle comprising the device according to the invention to be able to straighten up correctly after cornering. Such a motorcycle on which a rocking shaft, whose length is for example 1.5 times greater than the length of displacement 52 of the forks, instead of twice the length, is mounted, would have difficulty in returning to the vertical position when coming out of a bend. On the contrary, this return to the vertical seems much easier for the example of the system shown in FIG. 4 which has a rocker arm whose length 51 is twice the length of displacement of the forks.

The assembly on the upper part 52 of the guide shafts of springs 54 having necessary characteristics and resistances may also largely assist the motorcycle to return to vertical. In fact, the upward displacement of the guide shafts 21 of fork 2 (FIG. 4) which is located inside the angle of inclination taken in a bend compresses the spring 54 which, with its force of distension, will have helped to ensure, on the one hand, that the movement of inclination was not too sudden and, on the other hand, that the return to the vertical is effected easily.

The articulation of the lower mechanism 1 (FIG. 3) carrying the suspension forks with the upper mechanism 4 carrying the rocker arm and the steering handle bar, is effected by means of the two suspension dampers 7 and 8; each of the heads 50 of the two dampers is fixed to one of the two ends 49 of the rocker arm which have a receiving device and each of the feet of the dampers is fixed on a device 33 located at each of the heads of the suspension forks 2 and 3. The heads and the feet of the dampers are maintained fixed to the receiver devices due to screws 76. This articulation of the two mechanisms which compose the members of the suspension sub-assembly gives the latter the functional unity which characterises it.

The main central shaft 9 is the master piece of the device according to the invention. In fact, the devices of which it is composed and which give it its form enable it, on the one hand, to carry the suspension sub-assembly with its two mechanisms, one carrying the forks 1 and the other carrying the rocker arm and the handle bar 4 and, on the other hand, to be articulated and therefore to articulate the whole on the frame at the steering column 10.

The devices of the central shaft enabling it to carry the suspension sub-assembly are: (a) its upper end part 44 enabling it to receive the support 43 which it maintains fixed with the nuts 28; (b) its median part where it maintains fixed at 14 the upper support 13 which, itself, maintains fixed the upper ends of the guide shafts of the forks, due to its nut 15 screwed on its threaded part 16; (c) its lower part 63 where it maintains fixed, with the nuts 18 and 79 (FIG. 5) screwed at 19 and 20, the lower support 17 which, itself, maintains fixed the lower ends of the guide shafts of the fork; (d) its cylindrical part included between the two supports 13 and 17, or between its point 16 and 19 where the double-flanged wheels 31 and 32 (FIG. 9) of the forks abut and move thereon during the displacements of the forks provoked by the banking movements of the motorcycle.

The device of the central shaft 9 enabling it to articulate on the frame at the steering column 10 (FIG. 5) and consequently to ensure for the whole system the function of steering, is located in that part of this shaft included between its upper end 44 and its upper median part 14. This part of the central shaft is composed: (a) of a device 77 of cylindrical form, with a diameter adapted to the inner diameter of the liners of the two bearings 11 which it maintains fixed and whose length or height is equal to that of the steering column 10; (b) of a threaded device whose diameter is slightly smaller than the inner diameter of the liners of the bearings and whose height is sufficient to allow the nuts 12 to be screwed. It is located in line with the cylinder 77.

These two devices allow rotation of the central shaft: the first by maintaining fixed the inner liners of the bearings 11 whose outer liners are fixed on the inner walls of the steering column and the second by allowing the adjustment and holding of the central shaft in the steering column due to the nuts 12. The function of steering of the device forming the subject matter of the invention is performed from a force exerted on the handle bar, as is the case for presently known motorcycles. In fact, when the handle bar 6, blocked on the support 43, itself blocked on the main central shaft 9, is actuated, the latter rotates on itself due to the steering mechanism housed in the steering column 10 of the frame 48. This rotation of the shaft takes with it the whole suspension sub-assembly, and therefore the wheels which the forks carry, as may be seen in FIG. 2.

The integration of the articulation of the two mechanisms 1 and 4 which, with the forks 2 and 3, compose the interdependent suspension sub-assembly, with the articulation of the devices and mechanisms of the main central shaft 9, which compose the steering sub-assembly, gives the suspension and steering system involving two interdependent wheels, according to the invention, the functional unity which characterises it, as shown in FIGS. 1, 2 and 4.

The suspension and steering device comprises a variant (FIGS. 12, 13) which, whilst respecting the shape, number, quality and articulation of its mechanisms and devices, allows it a greater resistance to the forces of suspension, steering and braking of the motorcycle which carries it, upon braking, this largely increasing its stability. In fact, the centre of braking of presently known motorcycles is located at their steering column, at least for sharp braking of the front wheel. The same applies for the device according to the invention which is not provided with the mechanism characterising the variant: an arm 57 (FIG. 12) for reinforcement, of which the rear end is fixed to the frame and the front end is articulated on a receiver device located at the lower end of the central shaft.

Such a variant involves six modifications of the device according to the invention.

The first modification concerns the lower end of the central shaft 9 which becomes the central shaft 56 (FIGS. 12,14). This end is extended by a small cylindrical part 58, having a diameter adapted to the front orifice 78 of the reinforcing arm 57, followed by a threaded part. The orifice 78 of the reinforcing arm is articulated at 58 on the central shaft 56 and it is maintained articulated due to the tightening of the adjusting and locking nuts 59. This articulation gives the suspension and steering system a complementary point of support and rotation giving greater resistance to efforts and greater stability and safety when braking. However, the fact that this reinforcing arm 57 is located between the two wheels may limit the capacity of rotation necessary for the function of steering. The purpose of the following modifications is to avoid this drawback.

The second modification concerns the upper end 61 (FIG. 14) of the central shaft. This end has been extended so as to be able to receive the support 62 (FIG. 14) carrying the rocker arm 5 and the handle bar.

The third modification concerns the support 62: it carries the rocker arm on an outer pin 65 (FIG. 14) whose diameter is adapted to the diameter of the central cylinder 75 of the rocker arm and is fixed to the central shaft due to its orifice 87.

The fourth modification is the existence of a support arm 64 which is fixed, on the one hand, to the end of the pin 65 and, on the other hand, is fixed at 66 to the support 55 (FIG. 14) carrying the guide shafts, as may be seen at 64, 65 and 66.

The fifth modification concerns the arrangements of the outer arms 38 and 40 of the forks 2 and 3. These arms are displaced towards the front of the forks 85 (FIG. 12), as may be seen at 73 and 74. This modification of the forks causes the centre of rotation 80 of the wheels to be advanced, as may be seen in FIG. 13, which enables the system to have a normal amplitude of rotation and steering.

The sixth modification concerns the orifices 81 with which the supports carrying the guide shafts are fixed to the central shaft 56 (FIG. 14). These orifices have been moved rearwardly of the supports 55, as may be seen at 81.

The device according to the invention (FIG. 4) as well as its variant (FIG. 12) may also be applied to motorcycles carrying ice or snow skis. To this end, it suffices to replace the forks 2 and 3 (FIG. 4) by forks 67 (FIGS. 16 and 17) carrying skis 83.

In fact, these forks have an arm 68 which carries as its lower end a device 69 enabling an "elastic block" 70 which carries the skis to be housed, whilst allowing them slight movements of adaptation as may be seen at 72 (FIG. 18).

Figure 19:
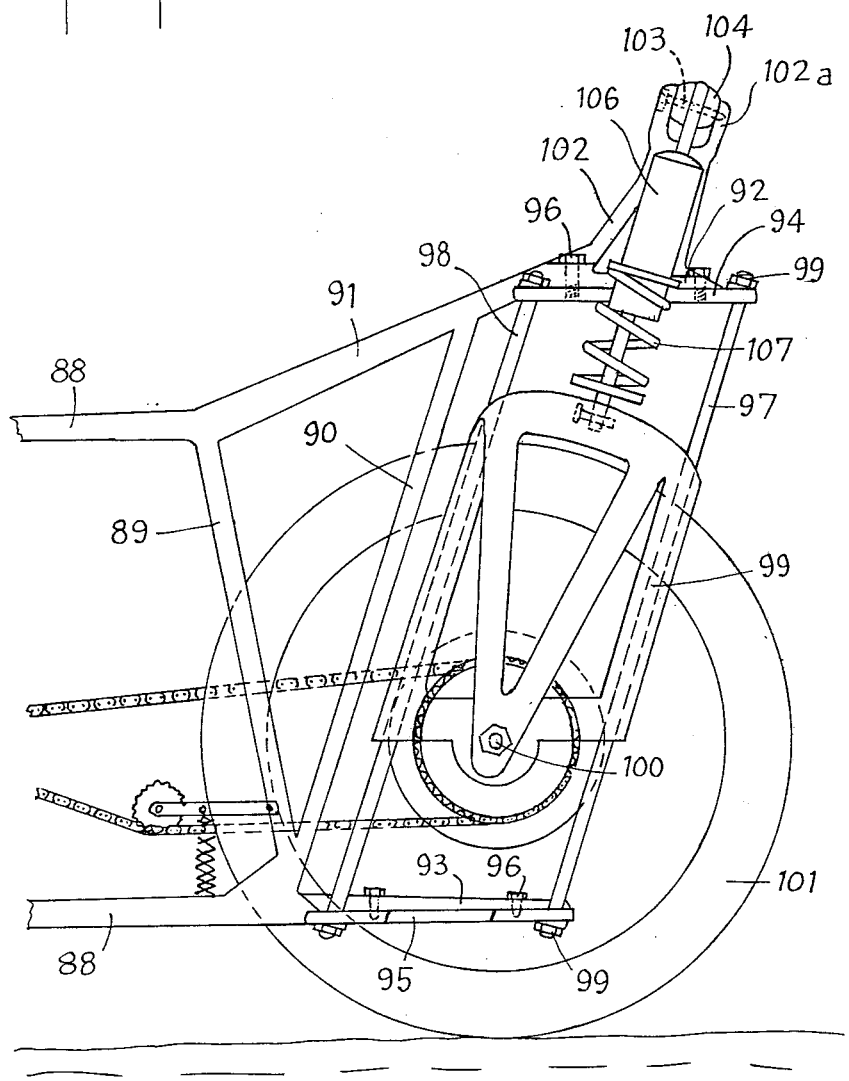
FIG. 19 is a view in side elevation of the suspension device for the back wheels of a cycle or motorcycle.

The suspension device shown in FIGS. 19 and 20 is mounted at the rear of the frame 88 of a motorcycle which is reinforced by crosspieces 80, 90 and 91, said frame being extended rearwardly by upper and lower elements 92 and 93 on which plates 94 and 95 are fixed by means of screws 96.

On the plates 94 and 95 and therebetween are fixed, by means of nuts 99, two pairs of parallel rods 97, 98 which ensure guiding of two forks 99, 99a mounted to slide by means of guides on said rods. The forks 99, 99a carry axles 100, 100a on which are mounted the rear wheels 101, 101a which are connected respectively to the drive member by a transmission member.

In the upper part of the frame 88 of the motorcycle, there is provided an arm 102 presenting at its free end a fork joint 102a in which is mounted, by means of a pin 103 and an elastic sleeve 104, a rocking arm 105, whose two ends are respectively connected by means of pins 108, 108a to suspension dampers 106, 106a connected to the forks 99, 99a of the back wheels. The dampers 106, 106a are mounted on the forks in combination with helical springs 107, 107a. This arrangement allows a parallel displacement of the forks 99, 99a carrying the back wheels 101, 101a.

The suspension and steering device forming the subject matter of the invention, as well as its variant, may be mounted and used on all types of presently known two-wheeled cycles and motorcycles.

In addition, by replacing the forks carrying wheels by forks carrying skis, this system may also be used for cycles and motorcycles intended for travel over snow, ice, water or sand. It may be used in all cases where it is desired to increase road holding, stability of braking and safety of any type in presently known cycles and motorcycles.

Particularly advantageous applications may be made for all types of wheeled motorcycles intended for sporting speed, endurance or "all-roads" competitions, but also, and in particular, for mass-produced motorcycles which, having a cubic capacity greater than 300 cm$^3$, are intended for daily use in town and/or on the highway.

The invention is, of course, not limited to the embodiments described and the man skilled in the art may make various modifications thereto without departing from the scope thereof.

What is claimed is:

1. A cycle having a relatively long and narrow frame, a pair of members at one end of said frame for contacting a supporting surface and suspension means supporting and interconnecting said members and said frame, said suspension means comprising:
   an arm pivotally mounted from said frame intermediate the ends of the arm for pivotal movement about an axis substantially parallel to the length direction of said frame;
   a pair of substantially parallel, rectilinear guides extending in the direction downwardly of said arm and mounted from said frame in fixed vertical relation thereto, said guides being horizontally spaced from each other;
   a pair of supports, one of said supports being mounted on one of said guides for rectilinear movement toward and away from said arm and the other of said supports being mounted on the other of said guides for rectilinear movement toward and away from said arm;
   first means connecting one of said members to one of said supports for movement therewith;
   second means connecting the other of said members to the other of said supports for movement therewith; and
   means connecting the respective ends of said arm respectively to one of said supports and to the other of said supports, whereby said members are movable in opposite directions with respect to each other and along rectilinear, parallel paths with tilting of said frame in a direction transverse to the length of the frame.

2. A cycle as set forth in claim 1 wherein said cycle further comprises a steering assembly pivotally mounted on said frame for steering said cycle, and wherein said arm and said guides are mounted on said steering assembly for movement therewith.

3. A cycle as set forth in claim 1 wherein each of said first means and said second means comprises spring means and damping means for permitting the distance between a support and the end of an arm to vary.

4. A cycle as set forth in claim 1 wherein said members are wheels and said supports are forks with arms, each of said wheels being mounted on an axle extending between the arms of a fork and being between the arms of the fork.

5. A cycle as set forth in claim 1 wherein said members are skis and wherein said first means pivotally connects one of said skis to the first-mentioned one of said supports and said second means pivotally connects the other of said skis to the second-mentioned other of said supports.

6. A cycle as set forth in claim 1 wherein said cycle further comprises a steering assembly having a steering shaft pivotally mounted on said frame for steering said cycle, wherein said guides are mounted on said steering assembly and wherein said members are wheels.

7. A cycle as set forth in claim 6 wherein the axes of rotation of said wheels are disposed in a plane containing the axis of said shaft.

8. A cycle as set forth in claim 6 wherein the axes of rotation of said wheels and said means connecting the respective ends of said arms to the supports are disposed in a plane substantially parallel to a plane containing the axis of said shaft and on the side of said last-mentioned plane opposite from the side thereof at which said frame is disposed.

9. A cycle as set forth in claim 8 further comprising a reinforcing arm secured at one end to said frame and at its opposite end, pivotally engaging said shaft at the lower end thereof.

10. A cycle as set forth in claim 1 wherein said arm is pivotally mounted on said frame by mounting means including an elastic sleeve.

11. A cycle as set forth in claim 1 wherein said cycle includes a steering assembly at one end of said frame and wherein said arm is pivotally mounted on, and said guides are secured to, the opposite end of said frame.

12. A cycle having a relatively long and narrow frame, a pair of members at one end of said frame for contacting a supporting surface, a steering assembly having a central shaft pivotally mounted on said frame and having a steering member at the upper part of said shaft, and suspension means supporting and interconnecting said members and said steering assembly, said suspension means comprising:
   an arm pivotally mounted on said assembly intermediate the ends of the arm for pivotal movement about an axis substantially parallel to the length direction of said frame;
   a pair of guide support members mounted on and secured to said shaft in spaced relation to each other and in spaced relation to said steering member;
   a pair of substantially parallel, rectilinear rods extending between and secured to said guide support members, said rods being spaced from each other;
   a pair of forks, one of said forks being slidably mounted on one of said rods for rectilinear movement toward and away from said arm and having rotatable wheels engaging said shaft and the other of said forks being slidably mounted on the other of said rods for rectilinear movement toward and away from said arm and having rotatable wheels for engaging said shaft;

first means connecting one of the first-mentioned said members to one of said forks for movement therewith;

second means connecting the other of the first-mentioned said members to the other of said forks for movement therewith; and means connecting the respective ends of said arm respectively to one of said forks and to the other of said forks.

13. A cycle as set forth in claim 12 wherein each of said first means and said second means comprises spring means and damping means for permitting the distance between a support and the ends of an arm to vary.

14. A cycle as set forth in claim 12 or 13 further comprising elastic means mounted on said guide rods intermediate each of said forks and the guide support member nearer said steering member.

15. A cycle as set forth in claim 12 or 13 in which each guide support member has oblong holes for receiving the ends of said rods whereby the positions of the rods may be adjusted.

* * * * *